June 1, 1948.  H. D. FOWLER  2,442,459
CARGO CONTAINER FOR AIRPLANES
Filed Dec. 18, 1942  2 Sheets-Sheet 1
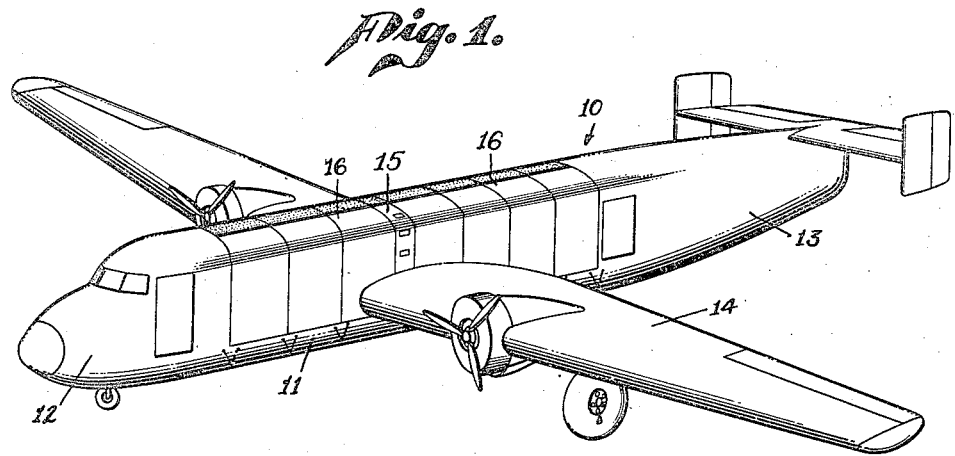
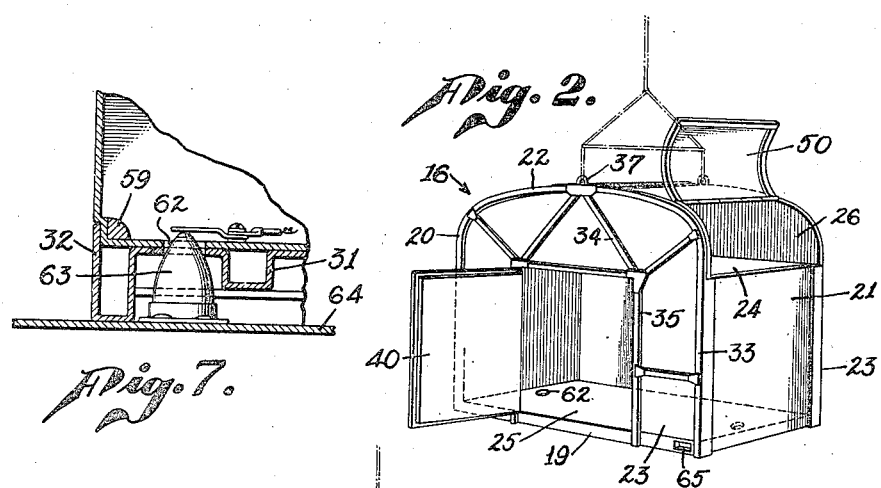
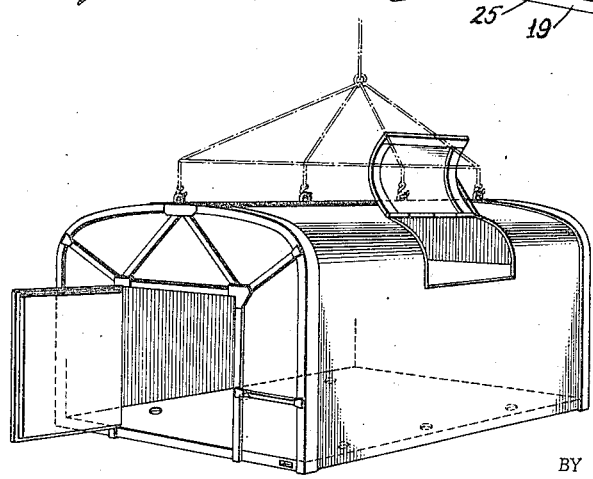
HARLAN D. FOWLER,
INVENTOR.
BY
ATTORNEY.

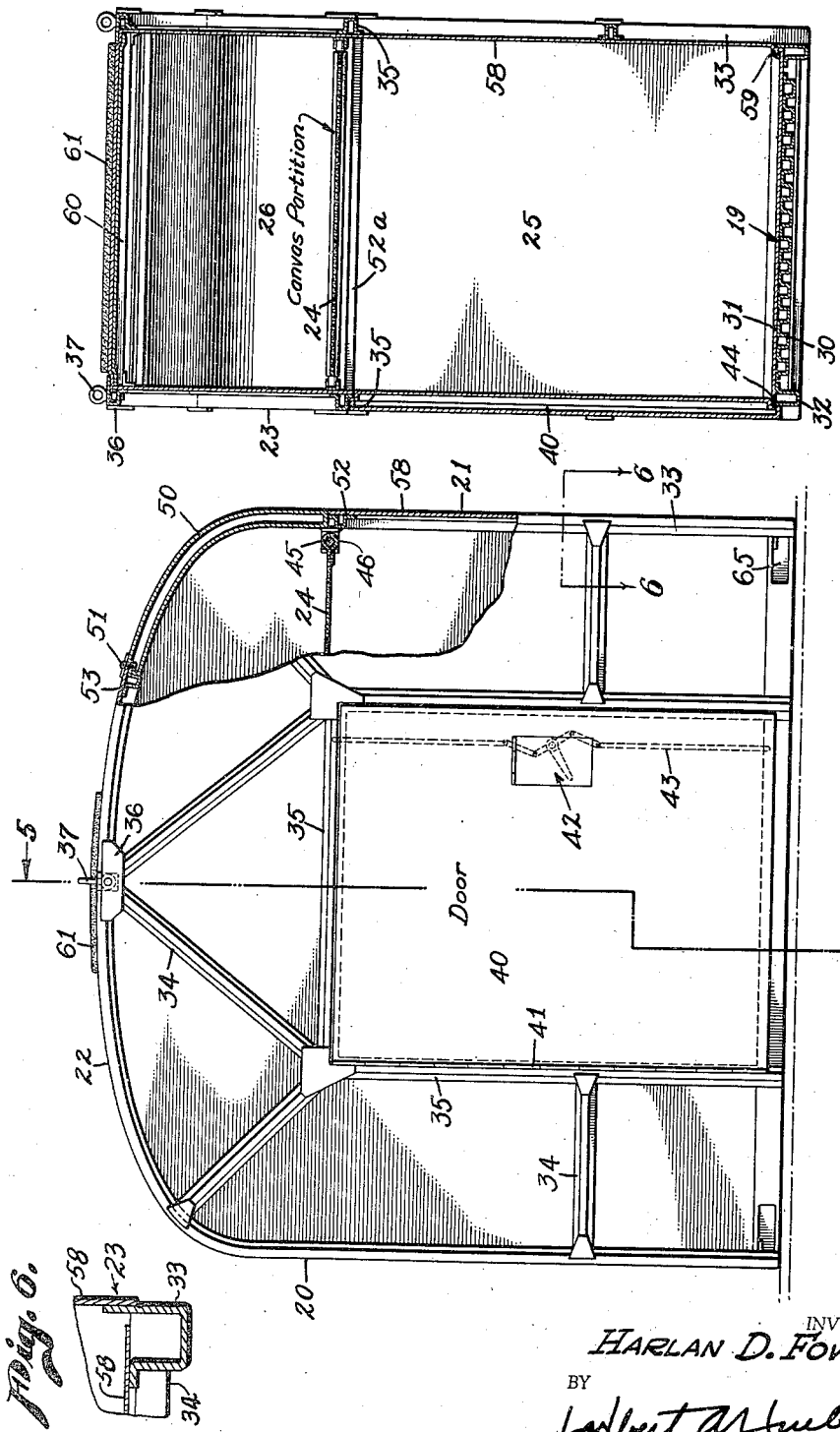

Patented June 1, 1948

2,442,459

UNITED STATES PATENT OFFICE 2,442,459

CARGO CONTAINER FOR AIRPLANES

Harlan D. Fowler, San Diego, Calif.

Application December 18, 1942, Serial No. 469,390

9 Claims. (Cl. 244—118)

This invention relates to express and freight airplanes, and particularly to a cargo container for airplanes of the character disclosed and claimed in my U. S. Patent No. 1,992,941 granted March 5, 1935 and in my copending application Serial No. 470,326 filed December 28, 1942, which has matured into Patent No. 2,407,774 granted September 17, 1946, for Airplane construction.

The handling of express and freight by air has presented various problems which were not solved by the conversion of passenger planes. The high cost of conventional passenger plane construction, present horsepower to attain speed, and inaccessibility for loading are some of the disadvantages. Moreover, the standard plane slopes when on the ground, further increasing difficulty of loading or unloading. The doors are relatively small, and to increase their size raises problems of stress and additional bracing. Air express and air freight must be moved with dispatch, and flying time is but one of the factors. Actual demonstration shows that the time necessary for loading and balancing the ship, and for unloading, is one of the major items in block-to-block pick up and delivery—which is what the shiper is interested in. Moreover, intermediate stops with standard converted equipment are time consumers because of the difficulty in segregating cargo from boxes and packages of miscellaneous sizes stowed in a large fuselage.

The improvement of air cargo transportation should be sought by a radical change in the method of handling the cargo, and a departure from conventional passenger plane design. Loading should be done so far as possible at warehouses or on loading docks, in containers which can be shifted to or from the plane, thereby facilitating the actual stowing of the boxes and packages, reducing the grounded time of the plane, enabling balance to be readily adjusted, and enabling the use of a slower plane with consequent economy in construction and cost of operation.

A suitable combination of fuselage and cargo containers is shown and claimed in my aforesaid patent.

Improvements over that earlier patent are the subject of my aforesaid copending application. These other disclosures show an airplane construction embodying an elongated platform providing cargo space intermediate the nose and tail of the fuselage, and interchangeable cargo containers adapted to be removably secured to the platform, and having exteriors of such shape that they collectively complete the streamlined design of the fuselage when in place.

It is a general object of my present invention to effect improvements in cargo containers of the character described.

One particular object is to provide a container in which the sides and top are covered with a relatively smooth skin and the outline of which conforms to the cross section of a streamlined airplane fuselage. The ends, which abut each other when installed in the plane, may have framework exposed and smooth skin on the inside to avoid chafing of cargo packages.

Another object is to provide a container of the character described having a lower compartment intended for through express or freight, and an upper compartment for intermediate delivery or for lighter packages. The lower compartment may advantageously have a door or doors at the ends only, which will abut when the containers are installed on the plane, and the upper compartments having doors in a form generally resembling a cowling, by which access is readily gained to the upper compartment whether or not the container is removed from the plane. This arrangement utilizes the full capactiy of the container, suitably distributes the boxes or packages, and enables the use of a large door for the lower compartment without complication in design for strentgh.

Additional objects are to provide means for locating the containers on the plane platform and to provide connection means for clamping the containers upon the platform.

A still further object is to provide a catwalk on the containers so that they may be traversed by an operator in loading them onto or off of a plane.

These, and other objects and advantages will become more apparent from further consideration of the description and drawings.

In the drawings:

Figure 1 is a perspective view of an airplane embodying my cargo containers as part of the complete plane for transit.

Figure 2 is a perspective view of my single unit cargo container removed from the plane.

Figure 3 is a perspective view of a modified form of cargo container having a larger capacity than the container in Figure 2.

Figure 4 is an enlarged end view in elevation partly cut away, of one of the containers with the end door closed.

Figure 5 is a vertical sectional view of the container taken on the line 5—5 of Figure 4.

Figure 6 is an enlarged sectional view taken on the line 6—6 of Figure 4.

Figure 7 is an enlarged fragmentary cross-sectional view of a container-locating and shift preventing means on the platform and container.

Referring to Figure 1, I there illustrate an airplane 10, comprising an elongated fuselage platform 11 supporting a nose compartment 12 and a tail assembly 13. Wings 14 extend from the platform, and except for a mounting of the leading wing spar (not shown) on the platform within a vertical housing 15, have their inner ends terminating at the edges of the platform, and do not interfere with the installation or removal of the cargo containers 16. Further details of the airplane shown are described in my aforesaid copending application.

The containers may be loaded with cargo at any convenient place and at any time (as for example, while the plane is in flight with a different complement of containers), and their loaded weight being known, and preferably displayed on the outside, may be correctly installed on the platform of the fuselage quickly and with proper balance to the plane. The plane will safely fly with one or more containers left off, as the space does not interfere with flight.

Each container of the type shown in Figure 2 comprises a bottom 19 which may be of metal, wood, or any suitable light weight but firm material, sides 20 and 21, a top 22, and ends 23.

The container is preferably divided by a horizontal partition 24 into a lower compartment 25 and an upper compartment 26.

In more detail, the bottom 19 may comprise a corrugated metal floor support 30 upon which rests a smooth flat sheet of metal 31. The marginal rectangular outline of this bottom may be defined by a channel frame 32.

Vertical channel frame members 33 are supported on the bottom in the manner illustrated to outline the ends of the container. These are preferably braced by similar channel members 34 properly spaced, and joining a rectangular vertical frame 35. Two of the members 34 extend from the upper corners of the frame 35 and meet at the top where they are coupled by a plate 36 and a lug 37, the latter being for reception of a hook on a hoist or block and tackle. Thus the lifting stress is distributed.

At one end (or both if desired), I provide a door 40, hinged at 41, and provided with a lock 42, which may utilize rods 43 adapted to be extended into the frame 35. This door is relatively large, is preferably hollow, having a smooth inside face, and is formed with an offset 44 adapted to effect a seal with the corners of the frame.

The horizontal partition 24 is preferably of canvas, which may be stretched between rods 45 removably seating in sockets 46.

The rod 45 which is located adjacent the door 50 may be removed from the sockets 46 and the partition 24 lowered or otherwise removed from its location between the upper and lower portions of the container. When this is done the entire interior of the container is accessible from the door 50.

I provide an upper side door 50, preferably of hollow construction, with the interior smooth, hinged at 51, extending from end to end of the container, and curved to conform to the end frames in the nature of a cowling. Horizontal channel frame members 52 and 53 cooperate with the end frames to provide a frame for this door. Any suitable means, not illustrated, may be employed to lock the door.

It will be noted that the side door is accessible at all times, whether the container is on a plane or at the terminal loading dock or on a truck, whereas the end door is inaccessible when positioned adjacent another container.

The container is lined with a smooth skin 58, which may be outside the frame on the sides and top, but should be inside at the ends, leaving the end frames exposed, the result being an interior substantially free from projections which cargo might engage and become damaged. I may also install a molding or wear strip 59 around the lower inside corners.

A horizontal frame member 52a is located opposite the member 52, and additional longitudinal frame members 60 extend along the top, serving to space the end frames, and also providing support for a catwalk 61 which will adequately support the weight of an operator.

For locating the containers on the airplane platform and to prevent shifting, I provide sockets or holes 62 in the bottom structure, to accommodate suitable guide plugs 63 mounted on the platform 64 of the airplane as illustrated in Figure 7 and also in my copending application, Serial No. 470,326.

To enable the container to be clamped or locked upon the airplane platform, I utilize recesses 65 at the bottom in the end portions of the channel frame 32, adapted to be engaged by suitable clamps or locking hooks.

The modified form of container shown in Figure 3 is substantially three times as long as the container shown in Figure 2, and may be substituted for the three containers 16 forward of the housing 15, or for three of the containers aft of the housing. It preferably utilizes large doors at each end, and may have but one section with an upper compartment, as shown.

In the use of my invention, the containers are loaded with merchandize, heavy articles below and lighter articles above, and any articles for an intermediate destination above. Of course it will sometimes be necessary to load a complete container for an intermediate point, at which the container will simply be removed, and another one substituted if available. If loaded away from the airport, the containers are transported there by truck, weighed, and retained pending arrival or departure of the plane.

By the use of any suitable crane, an example of which is shown and described in my copending application Ser. No. 468,645, filed Dec. 11, 1942, now abandoned, for Cargo air transfer and system, the loaded containers are hoisted and deposited on the fuselage platform of the airplane. Guide plugs engage the sockets and correctly locate the containers. An operator may stand on the housing 15 to assist in lowering the containers, and when one is in place he may move on the catwalk for attending to the next one. When the containers are all in place, clamping devices are operated to securely lock the containers down, and the plane is ready for flight. At intermediate points en route, one or more containers may be removed, and other substituted, or articles may be removed from the upper compartments of the containers by wheeling up a ladder and opening one of the cowling doors.

There is no tendency for the cowling doors to accidentally open during flight due to their contour, and down closing arrangement. The large end doors cannot accidentally open because they are not only locked but are abutting and are in effect in the interior of the plane.

Any tendency of the cargo to be damaged by shifting against the walls of the containers is minimized by the structure which provides smooth skin on all of the vertical walls. My novel construction eliminates cross bracing at the sides, except below the partition 24, the end frame members are outside, and the end doors are covered with metal skin, so the interior presents a smooth surface. Any space between containers created by the end frame members, and by normal clearance, will have no noticeable effect on the performance of the airplane.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures.

Among other equivalent features, I may employ a door at each end of the container, or at one end only, utilizing a similar frame structure at both ends, but omitting the door at one end and causing the skin covering to close the area which otherwise would be occupied by the door. Details of the frame may be varied, but it is important that the relationship of frame and skin be such that the interior is substantially smooth. Instead of the corrugated metal bottom support, some other form and material may be employed. Other possible modifications will be apparent within the spirit of my invention as claimed.

Certain of the advantages of my invention will appear from a reading of the foregoing description. Other advantages arise from the construction of the door 50 with an arcuate cross section which makes it a light weight, strong door, self-stiffened when in either an opened or closed position. Other advantages arise from the construction of the partition 24 of light, strong material such as canvas. It occupies very little space in a container and yet is strong enough to support numerous light articles and packages which make up a considerable part of the cargo of freight carrying airplanes. Still another advantage arises from the construction of the mounting for the partition 24 which construction permits the partition to be readily removed to enable a machine, piece of furniture or other large object to be put into a container 16 when such object is too high to go into a lower compartment 25. A further advantage arises from making the partition 24 flexible so that it can be removed through the upper door of a container should be lower door be inaccessible as when the container is positioned on an airplane between two other containers. One of the removable mountings of the partition 24 is positioned closely adjacent the upper door 50 through which it can be readily reached and manipulated should the large door 40 be inaccessible.

Having described my invention, what I claim as new and desire to secure by Letters Patent is:

1. A removable cargo section conforming in cross-section to the cross-section of the fuselage of an airplane having a load-carrying platform on which the section is normally mounted, said cargo section having a bottom by which it may be removably supported on said platform, end walls and top and side walls which in contour conform to the cross-section of said fuselage and which provide exterior surface areas thereof, a horizontal partition for dividing said cargo section into upper and lower compartments, a door in one of said end walls through which access may be had to said lower compartment when the cargo section is removed from said platform, the top of said door being located substantially at the height of said partition, and a second door, a portion of which is in the top wall of said cargo section and a portion of which is in a side wall and through which access may be had to said upper compartment without removing said cargo section from said platform, the lower edge of said second door being located substantially at the height of said partition.

2. A removable cargo section conforming in cross-section to the cross-section of the fuselage of an airplane having a load-carrying platform on which the section is normally mounted, said cargo section having a bottom by which it may be removably supported on said platform, end walls and top and side walls which in contour conform to the cross-section of said fuselage, a horizontal partition for dividing said cargo section into upper and lower compartments, a door in one of said end walls through which access may be had to said lower compartment when said cargo section is removed from said platform, the top of said door being located substantially at the height of said partition, and a second door, a portion of which is in a side wall, through which access may be had to said upper compartment without removing said cargo section from said platform, the lower edge of said second door being located substantially at the height of said partition.

3. A removable cargo section conforming in cross-section to the cross-section of the fuselage of an airplane having a load-carrying platform on which the section is normally mounted, said cargo section having a bottom by which it may be removably supported on said platform, end walls and top and side walls which in contour conform to the cross-section of said fuselage and in so doing define longitudinally-extending corners at the top and opposite sides of the cargo section which are convex in curvature, a horizontal partition, means for removably supporting said partition so that it divides said cargo section into upper and lower compartments, a door in one of said end walls through which access may be had to said lower compartment when said cargo section is removed from said platform, the top of said door being located substantially at the height of said partition, and a second door, part of which forms a portion of said top wall and part of which forms a portion of one of said side walls and through which access may be had to said upper compartment without removing said cargo section from said platform, said second door having the same convex curvature as the corner portion of said cargo section of which it forms a part and the lower edge thereof being located substantially at the height of said partition.

4. A removable cargo section conforming in cross-section to the cross-section of the fuselage of an airplane having a load-carrying platform on which the section is normally mounted, said cargo section having a bottom by which it may be supported on said platform, end walls and top and side walls which in contour conform to the cross-section of said fuselage, and in so doing define longitudinally-extending corners, at the top and opposite sides of the cargo section which are convex in curvature, a horizontal, flexible partition, mounting means for removably supporting said partition so that it divides said cargo section into upper and lower compartments, a door in one of said end walls through which access may be had to said lower compartment when said cargo section is removed from said platform, the top of said door being located substantially at the height of said partition, and a second door, part of which forms a portion of said top wall and part of which forms a portion of one of said side walls and through which access may be had to said upper compartment and to said mounting means without removing said cargo section from said platform, said door having the same convex curvature as the corner portion of said cargo section of which it forms a part and the lower edge thereof being located substantially at the height of said partition.

5. A removable cargo section for an airplane having a streamlined fuselage and a platform comprising a box-like structure including a bottom by which the cargo section may be supported upon said platform, exterior end frames adapted to be located in face to face relationship with end frames of adjacent sections when in place on an airplane, said end frames including cross bracing on the exterior and a smooth skin on the interior thereof, said box-like structure having side and top walls smooth surfaced on both exterior and interior stretched between said end frames and including longitudinal frame members on the interior located between the end frames, one of said longitudinal frame members on each side being positioned adjacent the junction of side walls and top walls forming a line of division between upper and lower interior portions of the box-like structure, another of said longitudinal frame members being located on one side remote from the center, and a door frame and a door above the side wall on said one side, the longitudinal frame members on said one side comprising upper and lower braces for said door frame.

6. A cargo section for an airplane having a streamlined fuselage and a cargo platform comprising a box-like structure including a bottom adapted to rest on the platform, end frames secured to the bottom defining by the perimeter thereof a streamlined outline, a smooth skin on the interior of the end frames forming end walls, a substantially smooth skin forming the exterior sides and upper portion of said box-like structure secured to the end frames, and a horizontal collapsible partition dividing the interior of said box-like structure into upper and lower portions, said partition comprising a collapsible sheet material having a width substantially equal to the distance between said end frames and a length substantially equal to the distance between the side walls and having one end permanently attached at one side wall of the box-like structure, the other end being removably attached at the other side wall thereof and providing thereby a bottom for the upper portion of the box-like structure.

7. A cargo section for an airplane having a streamlined fuselage and a cargo platform comprising a box-like structure including a bottom adapted to rest on the platform, end frames secured to the bottom defining by the perimeter thereof a streamlined outline, a smooth skin on the interior of the end frames forming end walls, a substantially smooth skin forming the exterior sides and upper portion of said box-like structure secured to the end frames, and a horizontal collapsible partition dividing the interior of said box-like structure into upper and lower portions, said partition comprising a collapsible sheet material having a width substantially equal to the distance between said end frames and having a length substantially equal to the distance between side walls and having one end permanently attached at one side wall of the box-like structure, the other end being removably attached at the other side wall thereof, and a door in the side wall above the removably attached end of said partition.

8. A removable cargo section for an airplane including a bottom, end frames attached to the bottom, smooth skins on the end frames forming end walls and a smooth skin attached to the edges of the end frames and the bottom forming side walls and a top for said section of streamlined contour, a door in at least one end wall extending throughout a substantial portion of the width, the respective frame for said last end wall comprising cross bracing and upright members including elements extending from the center of the top of said section diagonally outwardly to respective top sides of the door and adjoining elements extending therefrom downwardly to engagement with the bottom, said members thereby comprising simultaneously supports for the door and a lifting connection between top and bottom of the section.

9. A removable cargo section for an airplane including a bottom, end frames attached to the bottom, stress carrying smooth skins on the end frames forming end walls and a stress carrying smooth skin attached to the edges of the end frames and the bottom forming side walls and a top for said section of streamlined contour, said section having a shallow upper portion and a relatively deep lower portion, a relatively large door in at least one end wall extending the full height of the lower portion and throughout a substantial portion of the width, and a lift member at the top center of each frame, the frame for said last wall comprising cross bracing and upright members including elements extending from engagement with the lift member on one of said frames diagonally outwardly to respective top sides of the door and adjoining elements extending therefrom downwardly to engagement with the bottom, said members thereby comprising simultaneously supports for the door and a lifting connection between top and bottom of the section.

HARLAN D. FOWLER.

REFERENCES CITED

The following references are of record in the file of this patent:

UNITED STATES PATENTS

| Number | Name | Date |
|---|---|---|
| 254,630 | Farrar | Mar. 7, 1882 |
| 1,192,231 | Scott | July 25, 1916 |
| 1,484,778 | Hawes | Feb. 26, 1924 |
| 1,527,263 | Miller | Feb. 24, 1925 |
| 1,581,689 | Perin | Apr. 30, 1926 |
| 1,649,598 | Kirchner | Nov. 15, 1927 |
| 1,704,758 | Meinhardt | Mar. 12, 1929 |
| 1,744,824 | Callison | Jan. 28, 1930 |
| 1,765,591 | Kellett | June 24, 1930 |
| 1,793,118 | Moores | Feb. 17, 1931 |
| 1,992,941 | Fowler | Mar. 5, 1935 |
| 2,038,064 | Stetson | Apr. 21, 1936 |
| 2,047,956 | Fitch | July 21, 1936 |
| 2,069,414 | Lentz | Feb. 2, 1937 |
| 2,070,347 | Woodruff | Feb. 9, 1937 |
| 2,075,042 | Knerr | Mar. 30, 1937 |
| 2,242,201 | Woods | May 13, 1941 |

FOREIGN PATENTS

| Number | Country | Date |
|---|---|---|
| 3,600 | Great Britain | 1889 |
| 527,663 | Germany | June 20, 1931 |